(12) United States Patent
Tran et al.

(10) Patent No.: US 12,309,157 B2
(45) Date of Patent: May 20, 2025

(54) SYSTEMS AND METHODS FOR USE IN BLOCKING NETWORK TRAFFIC

(71) Applicant: MASTERCARD TECHNOLOGIES CANADA ULC, Vancouver (CA)

(72) Inventors: Yen Tran, Darien, CT (US); Brian Mukeswe, Burnaby (CA); Sandeep Murugesh, Scarborough (CA); Jeff L. Wartes, Seattle, WA (US); Blake Elliott, Seattle, WA (US)

(73) Assignee: MASTERCARD TECHNOLOGIES CANADA ULC, Vancouver (CA)

( * ) Notice: Subject to any disclaimer, the term of this patent is extended or adjusted under 35 U.S.C. 154(b) by 222 days.

(21) Appl. No.: 18/217,035

(22) Filed: Jun. 30, 2023

(65) Prior Publication Data

US 2024/0015159 A1     Jan. 11, 2024

Related U.S. Application Data

(60) Provisional application No. 63/358,471, filed on Jul. 5, 2022.

(51) Int. Cl.
*H04L 15/16* (2006.01)
*H04L 9/40* (2022.01)

(52) U.S. Cl.
CPC ............ *H04L 63/102* (2013.01); *H04L 15/16* (2013.01); *H04L 63/105* (2013.01); *H04L 63/107* (2013.01); *H04L 63/1425* (2013.01)

(58) Field of Classification Search
CPC ... H04L 63/102; H04L 63/105; H04L 63/107; H04L 63/108; H04L 63/123; H04L 63/1425; H04L 63/1458; H04L 63/1466; H04L 63/1475

USPC ................................ 709/203, 220, 224–228
See application file for complete search history.

(56) References Cited

U.S. PATENT DOCUMENTS

| 8,751,049 B2 * | 6/2014 | Linder ............... G06Q 30/0641 345/173 |
| 9,363,569 B1 * | 6/2016 | van Hoff .............. H04N 13/271 |
| 10,452,993 B1 * | 10/2019 | Hart ........................ G06N 20/00 |

(Continued)

FOREIGN PATENT DOCUMENTS

| CA | 2890433 A1 * | 5/2014 | ............. G06Q 50/01 |
| TW | 201203956 A * | 1/2012 | ......... H04L 12/4641 |

*Primary Examiner* — Khanh Q Dinh
(74) *Attorney, Agent, or Firm* — Harness, Dickey & Pierce, P.L.C.

(57) ABSTRACT

Systems and methods are provided for identifying and blocking network interactions. One example computer-implemented method includes accessing, by a server computing device, access data associated with an interaction between a user and a virtual location of a first party, where the access data includes a common data element specific to the interaction and at least one click behavior, and accessing identity data associated with the interaction between the user and the virtual location, where the identity data includes the common data element specific to the interaction and identifying data associated with the user. The method then includes joining the access data and the identity data based on the common data element, generating a score based on the joined data and a model, where the sore is indicative of a probability of a type of the user, and reporting the generated score to the first party.

14 Claims, 3 Drawing Sheets

(56) References Cited

U.S. PATENT DOCUMENTS

| | | | |
|---|---|---|---|
| 2009/0138335 A1* | 5/2009 | Lieberman | G06Q 30/0204 |
| | | | 705/7.33 |
| 2011/0288964 A1* | 11/2011 | Linder | B25J 9/1697 |
| | | | 700/275 |
| 2012/0101871 A1* | 4/2012 | Lieberman | G06Q 30/0269 |
| | | | 705/7.29 |
| 2016/0210427 A1* | 7/2016 | Mynhier | G16H 10/60 |
| 2019/0354073 A1* | 11/2019 | Horgan | G07C 9/37 |
| 2020/0357059 A1* | 11/2020 | Kennedy | G06N 20/20 |
| 2020/0365008 A1* | 11/2020 | Sjölund | G08B 25/001 |

* cited by examiner

SYSTEMS AND METHODS FOR USE IN BLOCKING NETWORK TRAFFIC

CROSS-REFERENCE TO RELATED APPLICATION

This application claims the benefit of, and priority to, U.S. Provisional Application No. 63/358,471, filed Jul. 5, 2022. The entire disclosure of the above application is incorporated herein by reference.

FIELD

The present disclosure generally relates to systems and methods for use in blocking network traffic and, in particular, to systems and methods for use in identifying particular network traffic, based on scoring, and then potentially, blocking the identified network traffic.

BACKGROUND

This section provides background information related to the present disclosure which is not necessarily prior art.

It is known for users to interact with third parties for a variety of purposes. For example, a user may present an account to purchase a product, or multiple of the same products, from a first party. The user may be an individual, purchasing the product for his/her own use, or as a gift for another person. Alternatively, the user may be a reseller, whereby the user purchases of the product(s) in order to resell the product(s) to one or more other users. In general, though, the first party reaps the benefit of the purchase (as the seller of the product(s)) regardless of the type of user involved.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings. The description and specific examples included herein are intended for purposes of illustration only and are not intended to limit the scope of the present disclosure.

When a user purchases a product, via a network interaction with a first party, the product is delivered or provided to the user, and the first party is compensated for the product, via the network interaction. When the user is a reseller, the user often purchases multiple products in bulk or in quantities greater than a typical user, which may impact the first party's ability to offer the products to other individual users (who are not resellers). The impact may cause the individual users to seek the product from other parties, or to purchase different products, or to not purchase products at all, etc., whereby the impact is negative. In this manner, the first party may need or desire to limit the network interactions by a reseller user, under certain conditions, but generally lacks a technical solution to effectively identify the reseller in order to timely limit the reseller.

Uniquely, the systems and methods herein permit reseller users (broadly, resellers) to be identified (e.g., by first party sellers, etc.) through data associated with the reseller users' interactions with virtual locations, whereby scores indicative of the users being reseller users is generated, and to respond accordingly.

Figure 1:
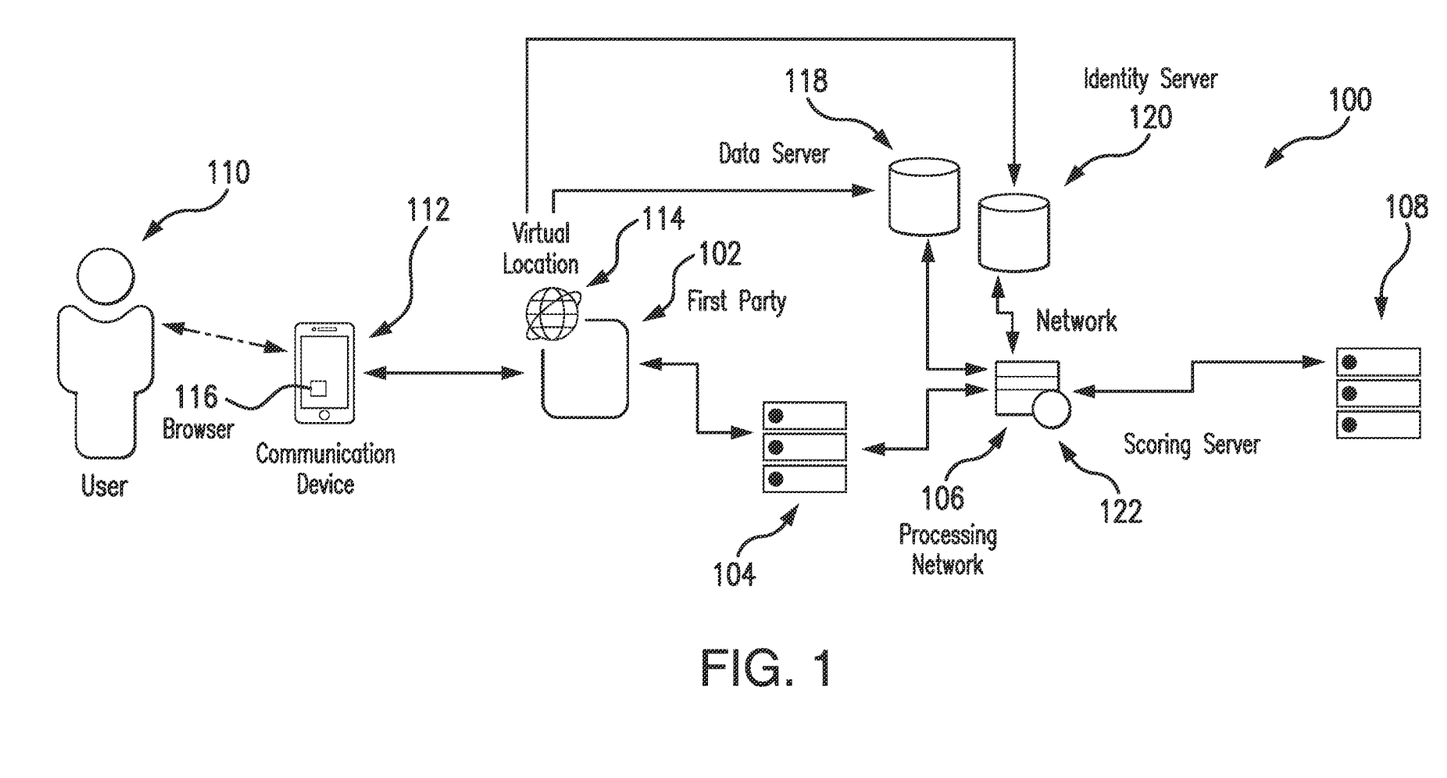
FIG. 1 illustrates an example system for use in identifying particular network interactions, based on scoring associated with parameters of the interactions and based on prior interactions.

FIG. 1 illustrates an example system 100 in which one or more aspects of the present disclosure may be implemented. Although parts of the system 100 are presented in one arrangement, it should be appreciated that other example embodiments may include the same or different parts arranged otherwise depending on, for example, types of interactions and/or users, privacy concerns and/or regulations, etc.

As shown in FIG. 1, the illustrated system 100 generally includes a first party 102, an acquirer 104, a processing network 106, and an issuer 108 of accounts, each coupled to (and each in communication with) one or more networks, as indicted by the arrowed lines. Each of the one or more networks may include, without limitation, a wired and/or wireless network, a local area network (LAN), a wide area network (WAN) (e.g., the Internet, etc.), a mobile network, and/or another suitable public and/or private network capable of supporting communication among two or more of the illustrated components of the system 100, or any combination thereof. One or more of the networks may further be segregated or separated, whereby, for example, the segregated or separated network(s) may include a private payment transaction network provided by the processing network 106 to the acquirer 104 and the issuer 108, and separately, a public network (e.g., the Internet, etc.) through which the first party 102 and a user 110 (i.e., a communication device 112 associated therewith) communicate, or through which the first party 102 communicates with the acquirer 104, processing network 106, and/or the issuer 108, etc. with regard to processing a transaction, etc.

In this example embodiment, the first party 102 is associated with one or more products, which are offered for sale to various users, including the user 110, for example.

The first party 102 may be available to (and/or accessed by) the user 110 at a virtual location 114, which may include, for example, a website (i.e., hosted by or on behalf of the first party 102), etc. The virtual location 114, consequently, is accessible by the user 110, at the communication device 112, via a browser 116 included at the communication device 112. The browser 116 may include, for example, Microsoft Edge, Google Chrome, Apple Safari, etc. When the virtual location 114 is accessed, the user 110 is permitted to browse the one or more products offered by the first party 102, select one or more of the products for purchase, add the one or more products to a virtual shopping cart, and then proceed to checkout to purchase the product(s), via the virtual location 114, as described in more detail below. It should be appreciated that as part of the user 110 accessing the virtual location 114, via the browser 116, a session is initiated, which is associated with a session ID. The session ID is consistent for the duration of the session. That is, the session ID is consistent as the user 110 accesses the website, adds products to the virtual shopping cart and proceeds toward checkout to pay for the products. It should be further appreciated that the session may end when the user 110 leaves the website, closes the browser 116, exhibits inactivity at the website and/or browser 116 for a duration, and/or after a defined interval, whereupon a new session ID may be assigned for continued access and/or upon returning to the website/browser 116, etc.

In addition to the session ID, the communication device 112 is generally associated with an IP address, from which the communication device 112 accesses one or more networks, and in particular, the Internet. The IP address is unique to the communication device 112, while used, and may be changed each time the communication device 112 connects to the Internet, for example, or by the configuration of the communication device 112, as explained more below.

It should be understood that the user 110 may be considered a first party user, when the user 110 is purchasing one or more product for themselves, or others, to consume, use, etc. Conversely, the user 110 may be considered a reseller (or reseller user), when the user 110 purchases one or more product to resell to other users, whereby the reseller is not purchasing the one or more products for themselves or others to consume, use, etc. (without resale therebetween).

With continued reference to FIG. 1, the acquirer 104 is a bank or other financial institution, which is configured to issue an account to the first party 102. The account is the destination for funds paid to the first party 102, for example, via payment account transactions, etc. Similarly, the issuer 108 is a bank or other financial institution, which is configured to issue an account (e.g., a credit account, a debit account, a prepaid account, etc.) to the user 110. As described herein, the account of the user 110 is the source of the funds paid to the first party 102, for example, via payment account transactions performed by the user 110 at the merchant 102 to purchase one or more products.

The processing network 106 is coupled in communication between the acquirer 104 and the issuer 108, via the one or more networks, and is configured to provide for communication therebetween, for purposes of authorization, clearing and settlement of interactions initiated by the first party 102, etc. (broadly, for processing transactions). The transactions (as well as other transactions in the system 100) are each facilitated through an authorization request, generated by the first party 102 and communicated through the acquirer 104 and the processing network 106, to the issuer 108, and through an authorization reply generated by the issuer 108 and communicated back to the first party 102, as described below. The authorization request and the authorization reply generally abide by the ISO 8583 standard in this example embodiment.

The processing network 106 is configured, in connection with the above, to compile and store transaction data for interactions coordinated therethrough. The transaction data may include, without limitation, account numbers, user identifiers, first party identifiers (e.g., merchant ID, etc.), acquirer identifiers, merchant category codes (MCCs), location data, time/date, amounts, etc.

While only one first party 102, one acquirer 104, one processing network 106, and one issuer 108 are shown in FIG. 1, it should be appreciated that additional instances of these entities or other entities may be included in other system embodiments. Moreover, only one user 110 is illustrated herein; however, other system embodiments will generally include a number of users, each associated with one or more communication devices as described above, for funding transactions with one or more first parties (e.g., merchants, etc.).

Figure 2:
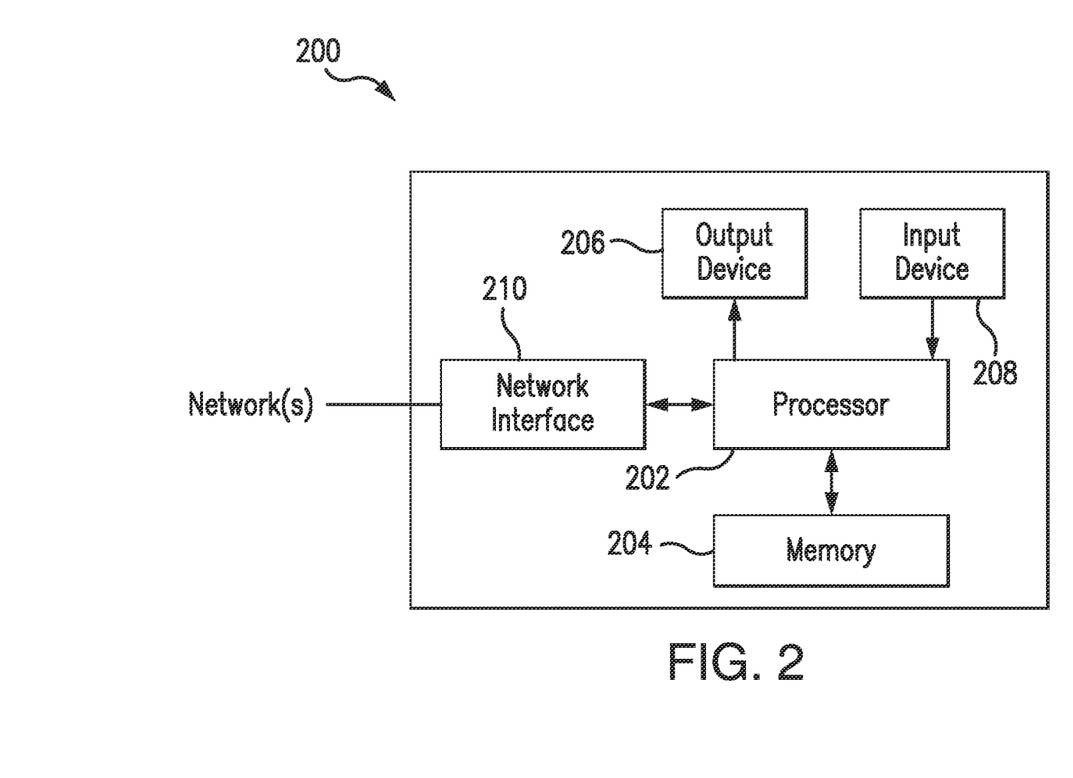
FIG. 2 is a block diagram of an example computing device that may be used in the system of FIG. 1.

FIG. 2 illustrates an example computing device 200 that can be used in the system 100. The computing device 200 may include, for example, one or more servers, workstations, personal computers, laptops, tablets, smartphones, point-of-sale (POS) terminals, payment devices, etc. In addition, the computing device 200 may include a single computing device, or it may include multiple computing devices located in close proximity, or multiple computing devices distributed over a geographic region, so long as the computing devices are specifically configured to function as described herein. In at least one embodiment, the computing device 200 is accessed (for use as described herein) as a cloud, fog and/or mist type computing device. In the system 100, the first party 102, the acquirer 104, the processing network 106, and the issuer 108 as well as the communication device 112 may each include and/or be considered one or more computing devices, which may include or be consistent, in whole or in part, with the computing device 200. With that said, the system 100 should not be considered to be limited to the computing device 200, as described below, as different computing devices and/or arrangements of computing devices may be used. In addition, different components and/or arrangements of components may be used in other computing devices.

Referring to FIG. 2, the example computing device 200 includes a processor 202 and a memory 204 coupled to (and in communication with) the processor 202. The processor 202 may include one or more processing units (e.g., in a multi-core configuration, etc.). For example, the processor 202 may include, without limitation, a central processing unit (CPU), a microcontroller, a reduced instruction set computer (RISC) processor, an application specific integrated circuit (ASIC), a programmable logic device (PLD), a gate array, and/or any other circuit or processor capable of the functions described herein.

The memory 204, as described herein, is one or more devices that permits data, instructions, etc., to be stored therein and retrieved therefrom. The memory 204 may include one or more computer-readable storage media, such as, without limitation, dynamic random-access memory (DRAM), static random access memory (SRAM), read only memory (ROM), erasable programmable read only memory (EPROM), solid state devices, flash drives, CD-ROMs, thumb drives, floppy disks, tapes, hard disks, and/or any other type of volatile or nonvolatile physical or tangible computer-readable media. The memory 204 may be configured to store, without limitation, transaction data, session IDs, IP addresses, contact information (e.g., email addresses, phone numbers, etc.), click patterns, and/or other types of data (and/or data structures) suitable for use as described herein. Furthermore, in various embodiments, computer-executable instructions may be stored in the memory 204 for execution by the processor 202 to cause the processor 202 to perform one or more of the functions described herein (e.g., one or more of the operations recited in the methods herein, etc.), such that the memory 204 is a physical, tangible, and non-transitory computer readable storage media. Such instructions often improve the efficiencies and/or performance of the processor 202 and/or other computer system components configured to perform one or more of the various operations herein, whereby upon executing such instructions the computing device 200 operates as (or transforms into) a specific-purpose device configured to then effect the features described herein. It should be appreciated that the memory 204 may include a variety of different memories, each implemented in one or more of the functions or processes described herein.

In the example embodiment, the computing device 200 also includes an output device 206 that is coupled to (and that is in communication with) the processor 202. The output device 206 outputs information, audibly or visually, for example, to the user 110 or to other users associated with any of the entities illustrated in FIG. 1, at a respective computing device, etc. The output device 206 may include, without limitation, a liquid crystal display (LCD), a light-emitting diode (LED) display, an organic LED (OLED) display, an "electronic ink" display, speakers, etc. In some embodiments, the presentation unit 206 may include multiple devices.

In addition, the computing device 200 includes an input device 208 that receives inputs from the user (i.e., user inputs) from the user 110 or other users in the system 100, etc. The input device 208 may include a single input device or multiple input devices. The input device 208 is coupled to (and is in communication with) the processor 202 and may include, for example, one or more of: a keyboard, a pointing device, a mouse, a touch sensitive panel (e.g., a touch pad or a touch screen, etc.), another computing device, and/or an audio input device. Further, in various example embodiments, a touch screen, such as that included in a tablet, a smartphone, or similar device, may behave as both the presentation unit 206 and the input device 208.

Further, the illustrated computing device 200 also includes a network interface 210 coupled to (and in communication with) the processor 202 and the memory 204. The network interface 210 may include, without limitation, a wired network adapter, a wireless network adapter, a mobile network adapter, or other device capable of communicating through the one or more networks, and generally, with one or more other computing devices, etc.

Referring again to FIG. 1, the system 100 further includes a data server 118, which is associated, in this embodiment, with the processing network 106. The data server 118 is a computing device (e.g., consistent with the computing device 200, etc.), which is configured to receive and/or capture data associated with a shopping session, or multiple shopping sessions, at the virtual location 114 of the first party 102 (as indicated by the arrowed line in FIG. 1). In particular, in the system 100, the user 110 is intended (or is able) to interact with the virtual location 114 to shop for and purchase products from the first party 102. In turn, the data server 118 is associated with (and/or is in communication with) the first party 102, whereby the data server 118 is configured to receive and/or capture access data associated with communication device 112, or user 110, accessing the virtual location 114 of the first party 102. The access data may include, for example, without limitation, an IP address (or multiple IP addresses), an electronic serial number (ESN) (or multiple ESNs), a session ID (or multiple session IDs), and other data indicative of the communication device 112 and/or the user 110, in this example. The access data further includes click data, which indicates the clicks or keystrokes by the user 110 (e.g., patterns, straight-line click to purchase, etc.), along with speed, frequency and/or characteristics of the clicks/keystrokes, etc. For example, a typical first party user may be expected to navigate the virtual location 114 at a particular speed, view different products (or alternatives), and/or review product details/ images, etc., while a reseller user, whether as a bot or a human user, may click directly to a particular product, add the product to a virtual shopping cart, and checkout with limited pausing, if any, between click/keystrokes (e.g., without reviewing content of the product or products, etc.), etc. To be clear, the data server 118 may be configured to receive the above access data from the first party 102, or to participate in capturing the above access data from the virtual location 114, etc., and then, the data server 118 is configured to store the access data.

It should be appreciated that other access data specific to a shopping session, and in particular, data indicative of how the user 110 (whether a bot or human) accesses with the virtual location 114, may be received, captured, retrieved, and/or stored by the data server 118.

Also, the system 100 includes an identity server 120, which is associated, in this embodiment, with the processing network 106. The identity server 120 is a computing device (e.g., consistent with the computing device 200, etc.), which is configured to receive and/or capture identity data associated with a network interaction involving the first party 102, for example. In particular, in the system 100, the first party 102 is configured to compile identity data associated with the communication device 112, as part of a purchase by the user 110 of one or more products in a virtual shopping cart at the virtual location 114, during a shopping session. The identity data includes, without limitation, data indicative of an identity of the user 110 (whether a bot or human) interacting with the first party 102, such as, for example, a name, a physical address, an IP address, a session ID, an email address, a phone number, etc. In this example embodiment, the first party 102 is configured to compile the identity data and to transmit the identity data to the identity server 120, which is configured to store the same. In other embodiments, the identity server 120 may be configured to participate in retrieving and/or capturing the identity data, prior to storing the identity data therein.

In addition to storing the data, each of the data server 118 and the identity server 120 may be configured to process the data in one or more manners, including, for example, by compiling one or more profiles based on specific data, etc. For example, where the data server 118 receives data representative of several interactions between the user 110 and the virtual location 114 (and other virtual locations), each having a common device ID, the data server 118 may be configured to compile a profile for the device ID, based on data associated with each interaction having that device ID, etc. Likewise, where the identity server 120 receives data representative of several interactions, each having a common physical address, the data server 118 may be configured to compile a profile for the physical address, based on data associated with each interaction having that physical address, etc. Profiles may be compiled for matching data, or for close matching data (e.g., where a phone number is one or two digitals different, or an address is in close proximity (e.g., neighbors, etc.), etc.), etc.

The data server 118 and the identity server 120 may be further configured to store the profile(s) in memory (e.g., the memory 204, etc.).

In view of the above, where the data server 118 and the identity server 120 are configured, relatively, to receive/ obtain access data and identity data for the virtual location 114, it should be appreciated that the data server 118 and the identity server 120 may be configured to compile access data and/or identity data specific to individual virtual locations. Additionally, or alternatively, the data server 118 and the identity server 120 may be configured to receive, retrieve, capture and/or process such data for multiple different virtual locations, and to further compile access data and/or identity data specific to individual virtual locations, as described above and below, across the multiple different virtual locations.

It should be appreciated that while each of the data server 118 and the identity server 120 are associated with the processing network 106, each may be integrated with or separate therefrom in various embodiments. Regardless, however, each is generally configured to provide the data, and/or profiles associated with the data, to a scoring server 122, as discussed below. It should further be appreciated that the data server 118 and the identity server 120 may be combined into a common server in one or more other embodiments, whereby the common server is configured as described above.

In connection with the above, the system 100 further includes scoring server 122, which, as shown in FIG. 1, is associated with and/or included in the processing network 106 in this embodiment. It should be appreciated however that the scoring server 122 may be separate from the processing network 106 in other embodiments, yet still coupled in communication with the data server 118 and/or the identity server 120. Further, in one or more embodiments, the data server 118, the identity server 120, and/or the scoring server 122 may be combined into a common server, whereby the common server is configured as described herein.

In this example embodiment, the scoring server 122 is configured to receive the data from the data server 118 (or access the data in its memory) and the identity server 120 and to join the access data and the identity data based on common data elements including, for example, a session ID associated with a shopping session at the communication device 112, or other communication device (or a device ID, IP address, etc.), etc. In this manner, the access data associated with the shopping session(s) is joined or associated with the identity data. Additionally, in one or more embodiments, the scoring server 122 is configured to receive, from the first party 102, either directly or via one of the servers 118 or 120, or otherwise, confirmed instances of reseller and non-reseller interactions, i.e., designation data, where each is associated with common data, such as, for example, a session ID, a device ID, an IP address, etc. The scoring server 122 is further configured to join the designation data based on common data element(s) including, for example, a session ID, etc.

As such, the scoring server 122 is configured to compile a joined set (or joined data set), which includes data indicative of interactions between various users and the virtual location 114, data indicative of the identities presented at the first party 102, and data indicative of whether or not the user is/was a reseller.

The scoring server 122 is configured to then separate the joined data set into a training data set and a validation data set. And, the scoring server 122 is configured to train a model, such as, for example, a random forest model with the training data set. In connection therewith, such training may be formulated as a supervised machine learning problem. For instance, in some embodiments the scoring server 122 may be configured to formulate such training for a classification problem (e.g., as a classification model, etc.), for which an objective may be to classify a session as belonging to one of multiple risk classes (or labels) (e.g., high, medium, low, etc.). Alternatively (or additionally), in some embodiments the scoring server 122 may be configured to formulate such training for a regression problem (e.g., as a regression model, etc.), for which an objective may be to calculate a risk score (e.g., on a numeric scale of 1-100, on other scales, etc.) for each session based on the observed attributes (e.g., of the training data set, etc.). An example model that may be used, trained, etc. in connection with compiling the classifications and/or risk score includes the NuDetect model from NuData Security of Mastercard®. In connection therewith, then, the model (e.g., as part of training, once trained, etc.) is configured to assign a numerical risk score or identity risk score/network risk score/IP risk for the given session(s) (e.g., based on the training data set during training and validation data set during validation, etc.), etc., which leverages one or more random forest models with the training data set and validation data set to generate the risk score (e.g., as a numerical value as described, etc.).

It should be appreciated that other models, beyond the random forest (and beyond the NuDetect model), may be employed in other system embodiments. For example, the scoring server 122 may be configured to use linear regression, logistic regression, näive bayes, k nearest neighbors, support vector machine and feed forward neural networks. Further, in some example embodiments, the scoring server 122 may be configured to use (or implement) a rule engine with score weights to incrementally penalize specific characteristics such as, for example, click counts that are too high or too low (e.g., based on a threshold, etc.), addresses/accounts/IP addresses similar or in close proximity to previously observed reseller addresses/accounts/IP addresses. In general, in various embodiments, the model(s) described above, as trained by the scoring server 122, may be an ensemble of two or more of the models listed herein.

Thereafter, the scoring server 122 is configured to receive access data and identity data associated with a particular interaction between the user 110 at the virtual location 114 (e.g., in real time, or near real time, etc.), to join the data, as described above, and to generate a score (based on the trained model) indicating a probability that the user to the interaction is a reseller user, as compared to a user intending to use the product(s) purchased. As above, the score may be a numeric score, for example, on a scale from 1-100, or the score may be otherwise (e.g., a label such as high, medium, low, etc.). The scoring server 122 may be configured to transmit the score to the first party 102 involved in the interaction, whereby the first party 102 may determine to decline the interaction based on the score (e.g., along, in comparison to a score threshold, etc.). In at least one embodiment, the scoring server 122 is configured to provide the score to the processing network 106, whereby the processing network 106 is configured to rely on the score to permit or block an interaction from the first party 102, initiated at the virtual location 114 (as identified by data included in the authorization request (e.g., a session ID, etc.), etc.).

Figure 3:
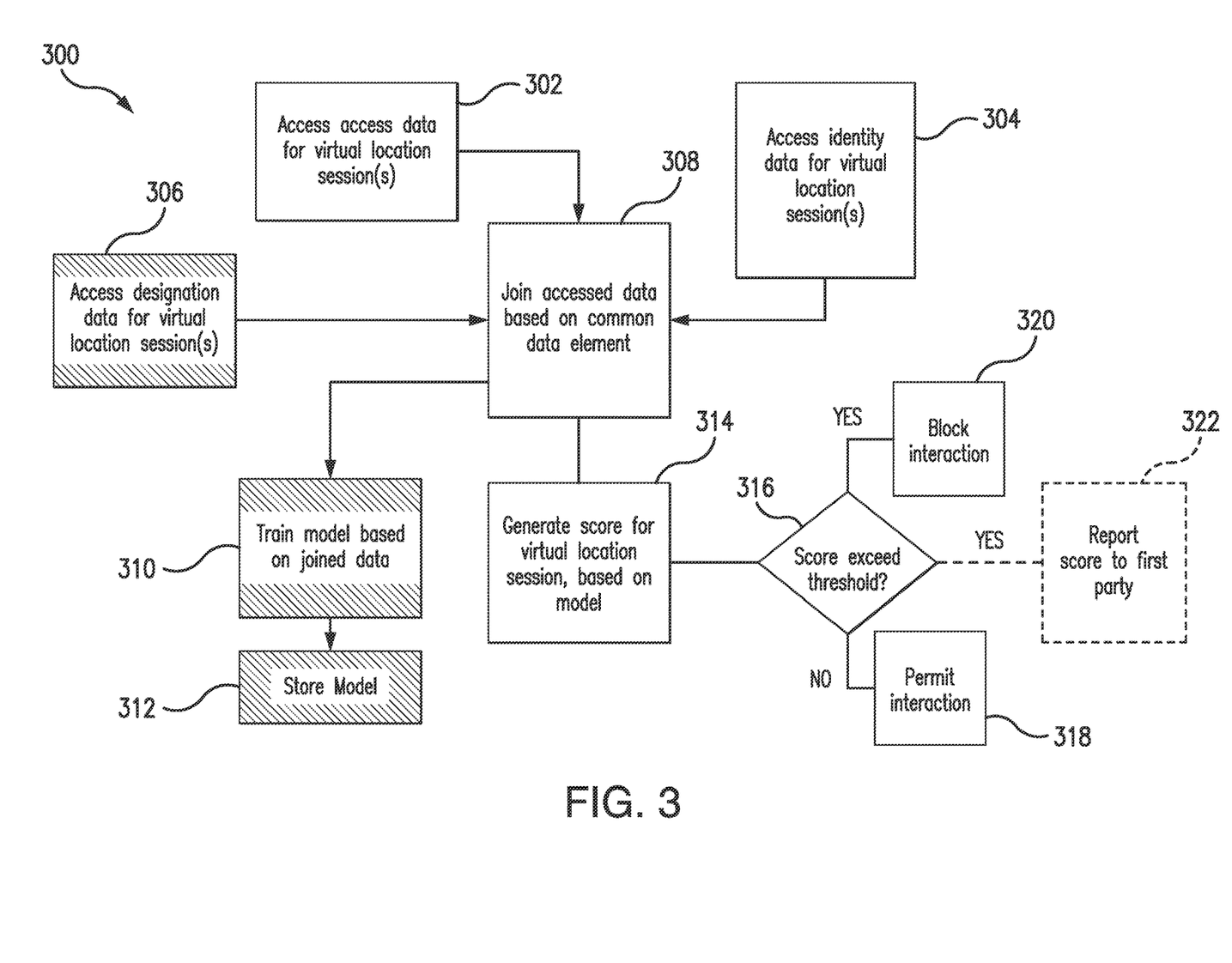
FIG. 3 illustrates an example method that may be implemented via the system of FIG. 1, for use in identifying particular network interactions, and then blocking the identified network interactions.

FIG. 3 illustrates an example method 300 for use in identifying and, potentially, blocking network interactions. The example method 300 is described (with reference to FIG. 1) as generally implemented in the scoring server 122 and other parts of the system 100, and with further reference to the computing device 200. As should be appreciated, however, the methods herein should not be understood to be limited to the example system 100 or the example computing device 200, and the systems and the computing devices herein should not be understood to be limited to the example method 300.

At the outset, it should be understood that the method 300 is described with reference to two separate phases, including a training phase and a use phase, where each phase includes steps in common. The steps shown in FIG. 3 with hatched marking, for example, are specific to the training phase, as explained in further detail below.

Initially, then, in the training phase of the method 300, at 302, the scoring server 122 accesses the access data for one or more virtual location sessions. In particular, the scoring server 122 may access the access data, which is in memory (e.g., the memory 204, etc.) included in the scoring server 122, or transmitted by, or retrieved from, the data server 118, or combinations thereof. In general, in this example, the access data includes click patterns/profiles, session IDs, device IDs, IP addresses, MAC addresses, etc., and also one or more profiles compiled by the data server 118, as associated with one or more common data elements.

Also, the scoring server 122 accesses, at 304, the identity data for one or more virtual location sessions. In particular, the scoring server may access the identity data, which is in memory (e.g., the memory 204, etc.) included in the scoring server 122, or transmitted by, or retrieved from, the identity server 120, or combinations thereof. In general, in this example, the identity data includes mailing addresses, phone numbers, email addresses, session IDs, device IDs, IP addresses, MAC addresses, etc., and also one or more profiles compiled by the identity server 120, as associated with one or more common data elements.

It should be appreciated that the access data and/or the identity data may represent dozens or hundreds, or more or less different users' interactions with the virtual location 114 (and/or multiple other virtual locations). For instance, in some embodiments, the access data and/or the identity data (as accessed) may represent millions of different users' interactions with the virtual location 114 (and other virtual locations).

In addition, as shown in FIG. 3, as part of the training phase, the scoring server 122 also accesses, at 306, designation data for virtual location sessions at the virtual location 114 (and/or other virtual locations). The designation data may include one or more common data elements for each session and also an indication of whether that session involved a reseller user, or a first party user (i.e., not a reseller user).

The scoring server joins, at 308, the accessed data (broadly, data sets including the accessed data), including the access data, the identity data, and/or the designation data based on a common data element, such as, for example, a session ID, etc. In particular, for example, the scoring server 122 may join the data sets, based on a common session ID, whereby the session ID is associated with a click pattern (which might include frequency of click and/or delay between clicks, or extraneous click counts, etc.), along with a physical address and a phone number, etc.

Next, at 310, the scoring server 122 trains a model based on the joined data, including the access data, the identity data and the designation data. In particular, as generally described above in the system 100, the scoring server 122 may formulate the training as a supervised machine learning problem such as, for example, a classification problem, a regression problem, etc. In connection with formulating the training as a classification problem, the scoring server 122 may operate with an objective of classifying a session as belonging to one of multiple risk classes (or labels) (e.g., high, medium, low, etc.). In connection with formulating the training as a regression problem, the scoring serve 122 may operate with an objective of calculating a risk score (e.g., on a numeric scale of 1-100, on other scales, etc.) for each session based on the observed attributes (e.g., of the training data set, etc.).

At 312, the scoring server 122 stores the model in memory (e.g., the memory 204, etc.), for later use, as described below. In this manner, the training phase is concluded. The training phase may be repeated at one or more intervals to take advantage of additional data from the data server 118, the identity server 120 and/or the first party 102, etc.

Thereafter, the user 110 interacts with the virtual location 114 of the first party 102, whereby access data is captured and/or received for the interaction. The access data associated with the specific session (and session ID, for example) is provided from the first party 102, directly (e.g., via an API associated with the scoring server 122, etc.) or via the data server 118, to the scoring server 122, whereby the scoring server 122 accesses the access data for the specific session (at 302). Likewise, in connection with a checkout by the user 110 at the virtual location 114, identity data for the specific session (a session ID, for example) is provided from the first party 102, directly (e.g., via an API associated with the scoring server 122, etc.) or via the identity server 120, to the scoring server 122, whereby the scoring server 122 accesses the identity data (at 304).

It should be appreciated that the access data and/or the identity data may be accessed in real time or near real time. Real time, for example, may include providing the data to the scoring server 122 immediately after or within a few seconds of the user 110 interacting with the virtual location 114 (e.g., within about one second, within about three seconds, within about five seconds, within about ten seconds, within about thirty seconds, within about one minute, etc.), and near real time may include providing the data to the scoring server 122 within a later time of the interaction with the virtual location 114, but still within about a minute and a half, about two minutes, about five minutes, or about 30 minutes, etc.

With continued reference to FIG. 3, the scoring server 122 then joins the access data and the identity data (at 308) based on, for example, the session ID. Next, at 314, the scoring server 122 generates a score for the joined data for the virtual location session, based on the stored model (i.e., as trained at step 310). In general, the score may include a numeric value, a range of values, a class, etc., which may be any suitable score, and/or which then may be expressed in another manner (based on the score, etc.). For example, the score may be a numeric value of 456, on a scale of 1-1000, where the higher the score the greater confidence that the user 110 is a reseller user. Or, in another example, the score may be selected from a class such as high, medium, or low, as an indicator of the probability that the user 110 is a reseller user. Other score types and/or expressions (e.g., numeric, alpha-numeric, words, phrases, etc.) may be provided from the model, as desired and/or required.

The scoring server 122, optionally, outputs the score to the first party 102, or to the issuer 108, etc., in one or more manners, whereby the score may be relied on to proceed in a network interaction or to block the network interaction as involving a reseller user, if desired.

In one particular embodiment, when the user 110 proceeds with checkout at the virtual location, an authorization request is compiled by the first party 102 and transmitted to the processing network 106, via the acquirer 104. The first party 102 compiles the session ID, or other suitable identifying data, into the authorization request, whereby the data is sufficient to identify the interaction to the joined data. In at least one embodiment, the authorization request provides the identity data, from the first party 102, to the processing network 106, and also the scoring server 122, which then joins the identity data to access data separately received from the first party 102, as indicated above, whereby the data is joined.

Regardless, the scoring server 122 generates the score, as described above (at 314), and then the scoring server 122 (or processing network 106) determines whether the score satisfies a threshold, at 316, where the threshold is defined by the first party 102, the issuer 108, or potentially, the processing network 106. When the score fails to satisfy the threshold (e.g., indicating a lower probability of the user 110 being a reseller, etc.), the scoring server 122 (or the processing network 106) permits the network interaction to proceed to the issuer 108, at 318, by forwarding the authorization request to the issuer 108 (where the issuer 108 authorizes or declines the interaction as is conventional). Conversely, when the score satisfies the threshold (e.g., indicating a higher probability of the user 110 being a reseller), the scoring server 122 (or processing network 106) blocks, or declines, the interaction, at 320, based on the score (and potentially, one or more rules associated with the score, the amount of the transaction, the MCC, etc.) and provides an authorization reply indicating the same to the first party 102, via the acquirer 104. The authorization reply may include a reasons code indicative of the score and/or an indication that the user 110 is likely a reseller user, etc.

Alternatively, the processing network 106 may receive the score from the scoring server 122 and append the score to the authorization request, prior to providing the authorization request to the issuer. In such an embodiment, the issuer 108 is then able to determine whether the network interaction should be blocked or not, based on the score (and potentially, one or more rules associated with the score, the amount of the transaction, the MCC, etc.).

Additionally, as shown in FIG. 3, the scoring server 122 (or processing network 106) may optionally, as indicated by the dotted lines, report the score to the first party 102, at 322, whereby, depending on the timing (e.g., prior to checkout being complete and/or a network interaction being initiated, etc.), the first party 102 may block the interaction with the user 110.

In view of the above, the systems and methods herein provide for scoring a user to provide a probability, or indication, that the user is a reseller user, whereby a merchant may decide, per occurrence, or by predefined rules, to block interactions with the reseller user in order to favor, account for and/or ensure interaction(s) with first party users.

Again, and as previously described, it should be appreciated that the functions described herein, in some embodiments, may be described in computer executable instructions stored on a computer-readable media, and executable by one or more processors. The computer-readable media is a non-transitory computer-readable storage medium. By way of example, and not limitation, such computer-readable media can include RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Combinations of the above should also be included within the scope of computer-readable media.

It should also be appreciated that one or more aspects of the present disclosure transform a general-purpose computing device into a special-purpose computing device when configured to perform the functions, methods, and/or processes described herein.

As will be appreciated based on the foregoing specification, the above-described embodiments of the disclosure may be implemented using computer programming or engineering techniques including computer software, firmware, hardware or any combination or subset thereof, wherein the technical effect may be achieved by performing at least one of the following operations: (a) accessing access data associated with an interaction between a user and a virtual location of a first party, the access data including a common data element specific to the interaction and at least one click behavior; (b) accessing identity data associated with the interaction between the user and the virtual location, the identity data including the common data element specific to the interaction and identifying data associated with the user; (c) joining the access data and the identity data based on the common data element; (d) generating a score, based on the joined data and a model, where the sore is indicative of a probability of a type of the user; (e) reporting the generated score to the first party (f) determining whether the generated score satisfies a defined threshold; (g) in response to the generated score satisfying the defined threshold, blocking said interaction and providing an authorization reply to the first party indicating the score and the blocked interaction, thereby reporting the generate score of the first party; and (h) training said model based on a training set of data.

Example embodiments are provided so that this disclosure will be thorough, and will fully convey the scope to those who are skilled in the art. Numerous specific details are set forth, such as examples of specific components, devices, and methods, to provide a thorough understanding of embodiments of the present disclosure. It will be apparent to those skilled in the art that specific details need not be employed, that example embodiments may be embodied in many different forms, and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When a feature is referred to as being "on," "engaged to," "connected to," "coupled to," "associated with," "included with," or "in communication with" another feature, it may be directly on, engaged, connected, coupled, associated, included, or in communication to or with the other feature, or intervening features may be present. As used herein, the term "and/or" and the phrase "at least one of" includes any and all combinations of one or more of the associated listed items.

Although the terms first, second, third, etc. may be used herein to describe various features, these features should not be limited by these terms. These terms may be only used to distinguish one feature from another. Terms such as "first,"

"second," and other numerical terms when used herein do not imply a sequence or order unless clearly indicated by the context. Thus, a first feature discussed herein could be termed a second feature without departing from the teachings of the example embodiments.

None of the elements recited in the claims are intended to be a means-plus-function element within the meaning of 35 U.S.C. § 112(f) unless an element is expressly recited using the phrase "means for," or in the case of a method claim using the phrases "operation for" or "step for."

The foregoing description of example embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A computer-implemented method for use in identifying and blocking network interactions, the method comprising:
   retrieving, by a server computing device, access data associated with an interaction between a user and a virtual location of a first party, the access data including a common data element specific to the interaction and at least one click behavior;
   retrieving, by the server computing device, identity data associated with the interaction between the user and the virtual location, the identity data including the common data element specific to the interaction and identifying data associated with the user;
   joining, by the server computing device, the access data and the identity data based on the common data element;
   generating, by the server computing device, a score, based on the joined data and a model, where the score is indicative of a probability of a type of the user;
   determining, by the server computing device, whether the generated score satisfies a defined threshold; and
   in response to the generated score satisfying the defined threshold, blocking said interaction and providing an authorization reply to the first party indicating the score and the blocked interaction, thereby reporting the generated score to the first party.

2. The computer-implemented method of claim 1, wherein the common data element includes a session ID for a shopping session at the virtual location.

3. The computer-implemented method of claim 1, wherein the identity data associated with the user includes one or more of: a mailing address, a phone number, and an email address.

4. The computer-implemented method of claim 1, wherein the type of the user includes a reseller user.

5. The computer-implemented method of claim 1, further comprising training said model based on a training set of data.

6. The computer-implemented method of claim 5, wherein the model includes a random forest model; and
   wherein training the model includes:
      retrieving historical access data for the virtual location, the historical access data being representative of an access data record for each of multiple prior interactions between prior users and the virtual location, each access data record including a session ID and at least one click behavior;
      retrieving historical identity data for the virtual location, the historical identity data being representative of an identity data record for each of multiple prior interactions between prior users and the virtual location, each identity data record including a session ID and identity data for the prior users involved in the prior interactions;
      retrieving historical designation data for the virtual location, the historical designation data being representative of a designation record for each of multiple prior interactions between prior users and the virtual location, each designation record including a session ID and an indication of a type of the prior user; and
      joining, by the server computing device, the historical access data, historical identity data, and historical designation data into the training set of data.

7. A non-transitory computer-readable storage medium comprising executable instructions, which when executed by at least one processor, cause the at least one processor to:
   retrieve access data associated with an interaction between a user and a virtual location of a first party, the access data including a common data element specific to the interaction and at least one click behavior;
   retrieve identity data associated with the interaction between the user and the virtual location, the identity data including the common data element specific to the interaction and identifying data associated with the user;
   join the access data and the identity data based on the common data element;
   generate a score, based on the joined data and a model, where the score is indicative of a probability of a type of the user; and
   determine whether the generated score satisfies a defined threshold; and
   in response to the generated score satisfying the defined threshold, block said interaction and provide an authorization reply to the first party indicating the score and the blocked interaction, thereby reporting the generated score to the first party.

8. The non-transitory computer-readable storage medium of claim 7, wherein the common data element includes a session ID for a shopping session at the virtual location.

9. The non-transitory computer-readable storage medium of claim 7, wherein the identity data associated with the user includes one or more of: a mailing address, a phone number, and an email address.

10. The non-transitory computer-readable storage medium of claim 7, wherein the type of the user includes a reseller user.

11. The non-transitory computer-readable storage medium of claim 7, wherein the executable instructions, when executed by the at least one processor, further cause the at least one processor to train said model based on a training set of data.

12. The non-transitory computer-readable storage medium of claim 11, wherein the executable instructions, when executed by the at least one processor, further cause the at least one processor, in order to train the model, to:
   retrieve historical access data for the virtual location, the historical access data being representative of an access data record for each of multiple prior interactions between prior users and the virtual location, each access data record including a session ID and at least one click behavior;

retrieve historical identity data for the virtual location, the historical identity data being representative of an identity data record for each of multiple prior interactions between prior users and the virtual location, each identity data record including a session ID and identity data for the prior users involved in the prior interactions;

retrieve historical designation data for the virtual location, the historical designation data being representative of a designation record for each of multiple prior interactions between prior users and the virtual location, each designation record including a session ID and an indication of a type of the prior user; and join the historical access data, historical identity data, and historical designation data into the training set of data.

13. A system for use in identifying and blocking network interactions, the system comprising at least one computing device configured to:

retrieve access data associated with an interaction between a user and a virtual location of a first party, the access data including a common data element specific to the interaction and at least one click behavior;

retrieve identity data associated with the interaction between the user and the virtual location, the identity data including the common data element specific to the interaction and identifying data associated with the user;

join the access data and the identity data based on the common data element;

generate a score, based on the joined data and a model, where the score is indicative of a probability of a type of the user, the model including one of an random forest model and a regression model;

determine whether the generated score satisfies a defined threshold; and in response to the generated score satisfying the defined threshold, block said interaction and provide an authorization reply to the first party indicating the score and the blocked interaction, thereby reporting the generated score to the first party.

14. The system of claim 13, wherein the common data element includes a session ID for a shopping session at the virtual location;

wherein the identity data associated with the user includes one or more of: a mailing address, a phone number, and an email address; and wherein the type of the user includes a reseller user.

* * * * *